(12) United States Patent
Park et al.

(10) Patent No.: US 12,355,092 B2
(45) Date of Patent: Jul. 8, 2025

(54) TUBULAR STRUCTURE FOR RECTANGULAR BATTERY CAN FOR ELECTRIC VEHICLE AND METHOD OF MANUFACTURING THE SAME

(71) Applicant: ALUTEC CO., LTD, Nonsan-si (KR)

(72) Inventors: Do Bong Park, Seoul (KR); Jin Woo Park, Daejeon (KR); Seong Heon Kim, Daejeon (KR)

(73) Assignee: ALUTEC CO., LTD, Nonsan-si (KR)

( * ) Notice: Subject to any disclaimer, the term of this patent is extended or adjusted under 35 U.S.C. 154(b) by 503 days.

(21) Appl. No.: 17/968,951

(22) Filed: Oct. 19, 2022

(65) Prior Publication Data

US 2024/0088507 A1 Mar. 14, 2024

(30) Foreign Application Priority Data

Sep. 8, 2022 (KR) ........................ 10-2022-0113954

(51) Int. Cl.
*H01M 50/249* (2021.01)
*B21C 35/02* (2006.01)
*H01M 50/209* (2021.01)
*H01M 50/224* (2021.01)
*H01M 50/564* (2021.01)

(52) U.S. Cl.
CPC ........ *H01M 50/249* (2021.01); *B21C 35/023* (2013.01); *H01M 50/209* (2021.01); *H01M 50/224* (2021.01); *H01M 50/564* (2021.01); *H01M 2220/20* (2013.01)

(58) Field of Classification Search
CPC ............ H01M 50/249; H01M 50/209; H01M 50/564; H01M 50/224; H01M 2220/20; B21C 35/023
See application file for complete search history.

(56) References Cited

FOREIGN PATENT DOCUMENTS

| KR | 10-2022-0056345 A | 5/2022 |
|----|---|---|
| KR | 10-2022-0101792 A | 7/2022 |
| KR | 10-2022-0017646 | 8/2022 |

*Primary Examiner* — Jane J Rhee
(74) *Attorney, Agent, or Firm* — NKL LAW; Jae Youn Kim

(57) ABSTRACT

A tubular structure for a rectangular battery can for an electric vehicle, which is thin and has very high dimensional accuracy in order to contain as much electrolyte as possible within a limited size, and a method of manufacturing the same are disclosed. In particular, extrusion of a material to a predetermined thickness is performed, and drawing of the extruded material to a thickness desired by a final product is performed. Accordingly, desired thickness uniformity of the final product is maintained.

6 Claims, 3 Drawing Sheets

TUBULAR STRUCTURE FOR RECTANGULAR BATTERY CAN FOR ELECTRIC VEHICLE AND METHOD OF MANUFACTURING THE SAME

BACKGROUND OF THE INVENTION

Field of the Invention

The present invention relates in general to a tubular structure for a rectangular battery can and a method of manufacturing the same, and more particularly to a tubular structure for a rectangular battery can for an electric vehicle, which is thin and has very high dimensional accuracy in order to contain as much electrolyte as possible within a limited size, and a method of manufacturing the same.

In particular, the present invention relates to a tubular structure for a rectangular battery can for an electric vehicle and a method of manufacturing the same, which maintain desired thickness uniformity of a final product manufactured through extrusion of a material to a predetermined thickness and drawing of the extruded material to a thickness desired by the final product.

Description of the Related Art

Aluminum is not only light, easily castable, well alloyable with other metals, and easily machinable at room temperature and high temperature, but also exhibits electrical and thermal conductivity. In this regard, aluminum is widely used in industry as a whole.

Meanwhile, in order to eliminate various problems including environmental pollution caused by excessive consumption of fossil fuels in association with vehicles, not only is development of an electric vehicle (EV) and a fuel cell electric vehicle (FCEV) being conducted, but also development of a hybrid electric vehicle (HEV) having hybrid characteristics of an internal combustion engine and an electric vehicle is being conducted. These vehicles essentially use a battery.

As such a battery, a nickel battery, a lithium battery, or the like is mainly used. Such a battery has a structure configured to convert electrical energy into chemical energy, to store the chemical energy, and to convert the stored chemical energy into electrical energy in order to use the electrical energy, using a positive electrode material, a negative electrode material, an electrolyte, a separation membrane, etc.

In such a battery for a vehicle, a battery can configured to store the positive electrode material, the negative electrode material, the electrolyte, the separation membrane, etc. mentioned above is an essential constituent element. Such a battery can is manufactured to have various structures. For example, such a battery can may have a rectangular shape, a cylindrical shape, etc.

Various technologies for manufacturing a battery can or a battery case have been developed, and examples thereof are disclosed in Patent Documents 1 to 3.

Patent Document 1 discloses a secondary battery can manufactured through extrusion and a method of manufacturing the same. The secondary battery can manufacturing method disclosed in Patent Document 1 is characterized by inclusion of a first step of forming a hollow rectangular can having a rectangular cross-sectional shape by extruding an aluminum bar through an extrusion mold, a second step of forming a first cap plate and a second cap plate covering openings formed at opposite longitudinal ends of the rectangular can by machining an aluminum plate, a third step of forming fastening protrusions at the cap plates, respectively, such that each of the fastening protrusions is inserted into a corresponding one of the openings and protrudes from one surface of a corresponding one of the cap plates while being stepped from an edge of the corresponding cap plate, a fourth step of forming a safety exhaust valve hole at one or both of the cap plates or one of shorter-axis side surfaces of a rectangular cross-section of the rectangular can, and forming a step around the safety exhaust valve hole, and a fifth step of seating a safety exhaust valve on the step such that the safety exhaust value covers the safety exhaust valve hole, and then fixing the safety exhaust value.

Patent Document 2 discloses a method of manufacturing a battery case for an electric vehicle. The method disclosed in Patent Document 2 includes a first step of preparing an aluminum plate having a thickness suitable for a battery case, and preparing a battery case plate deployed to have a predetermined size through a blanking process for the aluminum plate such that the battery case plate has opposite connection portions respectively formed with an engagement member and an engagement groove to be engaged with each other when the battery case plate is formed into the battery case, a 1-1-th step of preparing an aluminum plate having a thickness suitable for an auxiliary plate of the battery case, and preparing the auxiliary plate by cutting the aluminum plate prepared for the auxiliary plate through a blanking process, a second step of forming two protrusions by a press die such that the two protrusions are formed at a longer side of the battery case when the battery case plate formed through the blanking process of the first step is formed into the battery case through a forming process, a step of pre-bending, by a forming process, the battery case plate deployed in the first step and the second step and formed with the two protrusions at the longer side thereof until just before the engagement groove and the engagement member respectively formed at the connection portions of shorter sides of the battery case plate engage with each other, a step of pressing the battery case plate in the pre-bent state in a press die such that the engagement groove and the engagement member respectively formed at the connection portions accurately engage with each other and, at the same time, forming each corner of the battery case to have a right angle, and a step of bringing the auxiliary plate prepared in the 1-1-th step into close contact with an inner surface of each shorter side of the battery case manufactured in the pressing step, and integrally bonding the auxiliary plate to the inner surface of the shorter side by spot welding or a strong adhesive, thereby sealing a gap between the engagement groove and the engagement member formed at the connection portions.

Patent Document 3 discloses a method of manufacturing a battery case for an electric vehicle. The method disclosed in Patent Document 3 includes a first step of preparing an aluminum plate, and preparing a battery case plate deployed to have a predetermined size by a blanking process for the aluminum plate, a 1-1-th step of preparing an aluminum plate having a thickness suitable for an auxiliary plate of the battery case, and preparing the auxiliary plate by cutting the aluminum plate prepared for the auxiliary plate through a blanking process, a step of bending, by a forming process, the battery case plate prepared in the above step, thereby manufacturing the battery case such that each corner of the battery case forms a right angle, a step of welding opposite connection portions of the battery case manufactured in the above step, and a step of bringing the auxiliary plate prepared in the 1-1-th step into close contact with an inner surface of a shorter side of the battery case, and bonding the auxiliary plate to the inner surface of the shorter side by spot welding or a strong adhesive.

Technologies for manufacturing various battery cases have been developed, as mentioned above. In particular, among such battery cases, the rectangular battery can having a rectangular box shape is generally manufactured by welding or bending and welding a plurality of plates. However, the rectangular battery can manufactured as mentioned above has a drawback of a great thickness.

In conventional technologies for manufacturing a rectangular battery can, there is a problem in that thicknesses of an extruded material in initial, middle and final stages of an extrusion procedure are different because a pressure difference is generated at the extruded material in the initial, middle and final extrusion stages due to flow of a solid-state metal. As a result, tolerances of the shape and size of the rectangular battery can may be ±0.15 mm even when a specific tolerance is applied. For this reason, there is a problem in that it is impossible to manufacture a rectangular battery can having a tolerance of ±0.07 mm or less. The tolerance of ±0.07 mm is a thickness tolerance recently required for a uniform charging capacity of an electrolyte and charging of the electrolyte at a high energy density. This thickness tolerance cannot be secured through general extrusion. To this end, use of a rolled plate in place of an extruded material or manufacture through deep drawing was a typical manufacturing method.

Although the technology for manufacturing a rectangular battery can through bending of a rolled plate satisfies a required thickness tolerance, it is necessary to perform welding after plate bending, to remove irregularities of a welding bead through machining, and to additionally perform thermal treatment for removal of welding stress in welded portions. In addition, it is necessary to perform a leak test for all welded portions in the rectangular battery can. When an electrolyte leaks from a welded portion, there is a possibility of fire. For sealing of front and rear plugs of the can through laser welding, it is necessary to form a step at a shorter side or a longer side of the can through machining or to form a separate protrusion at the plugs. However, formation of a step in a thin region is very difficult. In the protrusion formation method, an increase in the number of processes and an increase in cost occur because a protrusion should be formed through additional machining. In shape rolling, it is difficult to achieve accurate positioning when bending is performed at a thickness change part. For this reason, there is a drawback of high generation of defects.

In addition, in the method of manufacturing a rectangular battery can through deep drawing of a rolled plate, it is necessary to separately perform trimming for the rolled plate such that the rolled plate has a plate shape suitable for deep drawing. Furthermore, desired dimensions and a desired shape may be secured only when deep drawing is performed at least 7 times. For this reason, there are drawbacks of a very complex process and a high increase in process cost. In addition, loss of a trimming material is generated. Furthermore, there may be an earing phenomenon occurring after deep drawing. In this case, cutting of an earing portion should be performed. For this reason, there are drawbacks of an increased loss amount of the material and an increase in process cost in the cutting process. In addition, the material gradually becomes thinner during deep drawing and, as such, there is a problem of tearing of the material occurring during deep drawing. Furthermore, the deep-drawn can is closed at one side thereof and, as such, it is necessary to cut the closed portion of the can, for charging of an electrolyte material. For this reason, there are problems of addition of a separate process, an increase in process cost, loss of material, etc.

RELATED ART LITERATURE

Patent Documents

Patent Document 1: Korean Unexamined Patent Publication No. 10-2022-0017646
Patent Document 2: Korean Unexamined Patent Publication No. 10-2022-0056345
Patent Document 3: Korean Unexamined Patent Publication No. 10-2022-1001792

SUMMARY OF THE INVENTION

Therefore, the present invention has been made in view of the above problems, and it is an object of the present invention to provide a tubular structure for a rectangular battery can for an electric vehicle, which is thin and has very high dimensional accuracy in order to contain as much electrolyte as possible within a limited size, and a method of manufacturing the same.

In particular, it is an object of the present invention to provide a tubular structure for a rectangular battery can for an electric vehicle and a method of manufacturing the same, which maintain desired thickness uniformity of a final product manufactured through extrusion of a material to a predetermined thickness and drawing of the extruded material to a thickness desired by the final product.

It is another object of the present invention to provide a tubular structure for a rectangular battery can for an electric vehicle and a method of manufacturing the same, which are capable of achieving a reduction in the number of manufacturing processes and a reduction in process time, thereby enhancing productivity.

In accordance with the present invention, the above and other objects can be accomplished by the provision of a method of manufacturing a tubular structure for a rectangular battery can for an electric vehicle, using an aluminum alloy, the method including hot-extruding a material prepared using the aluminum alloy at a high temperature such that the extruded material has a rectangular cross-section while having a thickness tolerance of ±0.07 to 0.10 mm, and drawing the hot-extruded material using a drawing mold such that the drawn material has a thickness tolerance of ±0.07 mm or less.

The drawing may be skin pass drawing.

The drawing mold may include a die mold and a plug mold, and may be manufactured such that a curvature of the plug mold is equal to or greater than a curvature of the die mold.

The hot-extruding may be performed under a pressure of 200 bar or more, at a high temperature of 500° C. or more, and at a speed of 1.0 to 5.0 mm/s.

The material drawn in the drawing may have a tubular structure, and the tubular structure may have, at a corner thereof, a curvature having a diameter of 1.0 to 4.0 mm.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
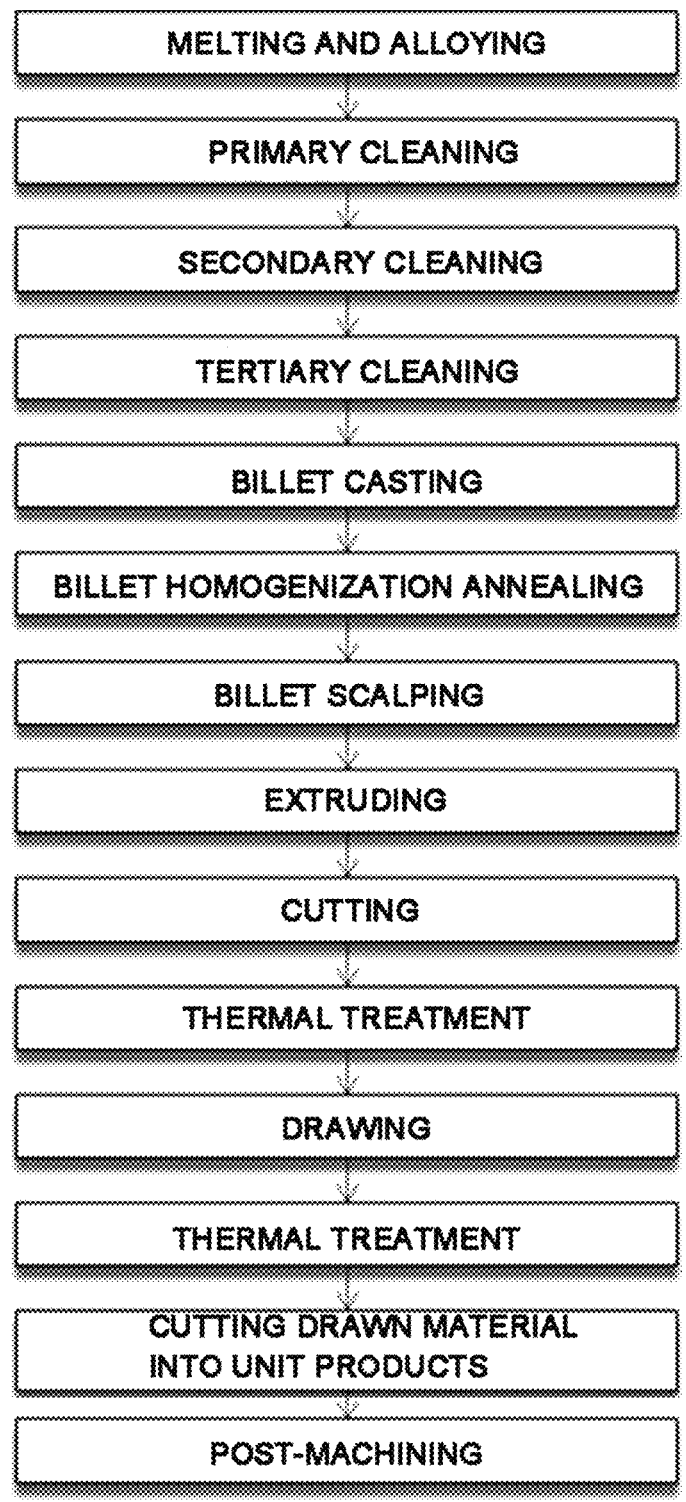
FIG. 1 is a flowchart of a method of manufacturing a tubular structure for a rectangular battery can for an electric vehicle in accordance with an exemplary embodiment of the present invention.

The present invention may be implemented through various alterations. Accordingly, the present invention will be described through specific embodiments illustrated in the accompanying drawings and detailed descriptions. However, the present invention should not be limited by the specific embodiments, and it is to be appreciated that all changes, equivalents, and substitutes that do not depart from the spirit and technical scope of the present invention are encompassed in the present invention.

The same or similar elements are designated by the same reference numerals. In the following description of the embodiments of the present invention, a detailed description of known functions and configurations incorporated herein will be omitted when it may obscure the subject matter of the embodiments of the present invention.

The present invention may provide a tubular structure enabling manufacture of a rectangular battery can for an electric vehicle, which is thin and has very high dimensional accuracy in order to contain as much electrolyte as possible within a limited size.

A material used in the present invention is an aluminum alloy. The aluminum alloy exhibits high specific strength, as compared to conventional stainless steel. The aluminum alloy has low specific gravity of 2.7 g/cm$^3$, as compared to stainless steel having specific gravity of 7.93 g/cm$^3$. Accordingly, an effect of a reduction in weight may be obtained. The coefficient of heat transfer of the aluminum alloy, which is an important characteristic of a battery, is 163 W/m·K. Since the coefficient of heat transfer of stainless steel is 16.2 W/m·K, the aluminum alloy may transfer a quantity of heat corresponding to 10 times or more of the heat quantity transferred by stainless steel. Therefore, the aluminum alloy is preferably used for an increase in battery lifespan and performance.

Referring to FIG. 1, a method of manufacturing a tubular structure for a rectangular battery can for an electric vehicle in accordance with an exemplary embodiment of the present invention is shown. As shown in FIG. 1, the tubular structure manufacturing method includes hot-extruding a material prepared using an aluminum alloy at a high temperature such that the extruded material has a rectangular cross-section while having a thickness tolerance of ±0.07 to 0.10 mm, and drawing the hot-extruded material using a drawing mold 10 such that the drawn material has a thickness tolerance of ±0.07 mm or less.

For securing excellent thermal conductivity of the rectangular battery can, impurity management of a raw material is important. Accordingly, melt refinement of the aluminum alloy is required. The melt refinement may be achieved by a primary cleaning step of introducing a flux into a melt prepared through charging of an ingot or scraps and the aluminum alloy, and stirring the melt using nitrogen (N) gas, thereby removing hydrogen gas, oxides, inclusions, foreign matter, etc. present in the melt, for uniform composition of the melt and management of impurities in the melt, a secondary cleaning step of removing hydrogen gas and impurities from the melt by stirring the primarily-cleaned melt using argon (Ar) gas while passing the melt through a gas bubbling filter (GBF), and a tertiary cleaning step of removing impurities from a secondarily cleaned aluminum alloy while passing the aluminum alloy through a ceramic foam filter.

A billet casting step of preparing a cast billet is performed after execution of the cleaning steps. Billet portions formed in initial and final casting stages may be non-uniform in composition or may include foreign matter. Accordingly, the billet portions formed in the initial and final casting stages while having 100 to 500 mm should be cut, and scrap treatment should be performed. The billet remaining after cutting should be subjected to a process for diffusing elements segregated within the billet and on the surface of the billet into a substrate, through homogenization annealing.

Before extrusion, the billet may be subjected to surface scalping in order to prevent introduction of an oxide coating layer on the surface thereof. When scalping is not performed, a cutting length of an extrusion butt may be increased.

The hot-extruding is a step of extruding a molten aluminum alloy while passing the molten aluminum alloy through an extrusion mold having a rectangular cross-section, thereby producing an extruded bar having a predetermined shape as a product.

The hot-extruding is a step of heating an aluminum alloy billet to 500° C. or more, and applying pressure to the heated aluminum alloy billet, thereby producing a plate having a predetermined thickness. The hot-extruding is performed at a high temperature.

Preferably, heat applied in the hot-extruding is 500° C. or more.

When an outlet temperature in the hot-extruding is less than 500° C., excessive pressure is applied to the extrusion mold, thereby causing the extrusion mold to be deflected. As a result, the resultant extruded tubular structure has a great thickness in an initial extrusion stage and a small thickness in a final extrusion stage and, as such, the thickness thereof may be beyond a required tolerance range. For this reason, there is a difficulty in post-machining. Through the hot-extruding, it may be possible to prevent deflection of the mold and, as such, to reduce a thickness difference between the initial extrusion stage and the final extrusion stage.

Of course, when the temperature in the hot-extruding is excessively high, namely 600° C. or more, problems such as generation of corner cracks, surface oxidation, local surface melting, etc. may occur during extrusion. Therefore, the extrusion temperature should be controlled so that an appropriate temperature may be maintained during extrusion. This temperature may be controlled by checking a pre-heating temperature of the billet, a length of the billet, an extrusion speed, an extrusion pressure, and a container temperature in the extrusion procedure.

Preferably, the hot-extruding is performed under a pressure of 200 bar or more and at a speed of 1.0 to 5.0 mm/s.

An aluminum alloy suitable for manufacture of a rectangular battery can is a 3000 or 6000-series aluminum alloy. Mn, which is a major alloying element of the 3000-series aluminum alloy, is an alloying element capable of suppressing growth of crystals at a high temperature and, as such, may suppress granulation. However, when the extrusion temperature is excessively high, abnormal granulation may occur. In order to prevent such a problem as well as surface oxidation and mold overheating, nitrogen gas is injected onto the mold and around the mold.

The 6000-series aluminum alloy, which includes Mg and Si as major elements thereof, is an alloy advantageous in manufacturing a rectangular battery can in that high strength may be secured through thermal treatment, and easy extrusion may be achieved. In this case, nitrogen gas is injected onto the mold and around the mold in order to prevent oxidation at a high temperature.

Although the tubular structure extruded by the hot-extruding may have a reduced thickness difference by virtue of extrusion at a high temperature, the tubular structure cannot secure a uniform thickness. To this end, a process for securing a uniform thickness through drawing is required.

The drawing is performed through skin pass drawing. The drawing mold is constituted by a die mold and a plug mold. As the extruded material passes between the die mold and the plug mold, drawing of the extruded material is carried out. Preferably, the die mold and the plug mold are manufactured such that the plug mold has a curvature equal to or greater than that of the die mold.

The drawing is a process for enhancing dimensional accuracy of the extruded material.

The extruded material drawn in the drawing may have a thickness deviation of ±0.07 mm or less.

Figure 2:
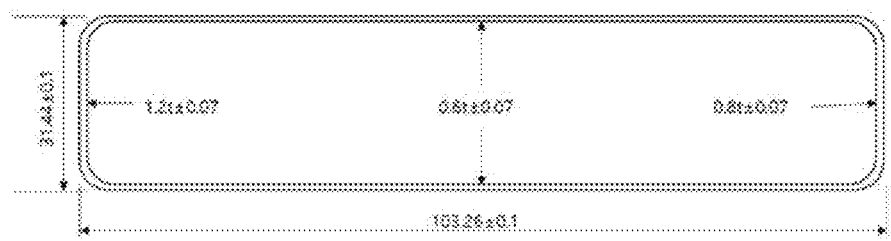
FIG. 2 is a view showing a tubular structure manufactured by the method of FIG. 1.

Referring to FIG. 2, a tubular structure for a rectangular battery can according to an exemplary embodiment of the present invention is shown. The tubular structure has the same curvature at four corners thereof. The curvature may be variable within a range of 0.5 to 10R. However, it is preferred that the curvature be within a range of 1.0 to 4.0 mm because the smaller the curvature, the greater the battery capacity.

The drawing is a step in which a gripper installed at a front side pulls a product in a state of gripping the product. Rupture may be generated at a grip portion of the product or at a point of a corner portion of the product where thickness change occurs. For this reason, the gripper grips the product under the condition that an insert is fitted around the grip portion. In this case, it may be possible to prevent abrupt angle variation caused by gripping.

In accordance with the exemplary embodiment of the present invention, the drawing mold is manufactured such that the plug mold has a curvature equal to or slightly greater than that of the die mold.

Figure 3:
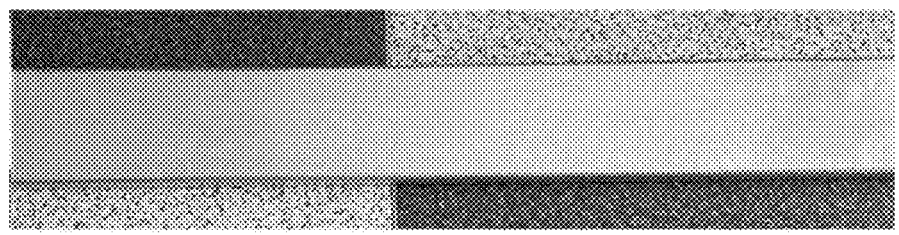
FIG. 3 is a photograph showing an example of a tubular structure manufactured by the method of FIG. 1.
Figure 4:
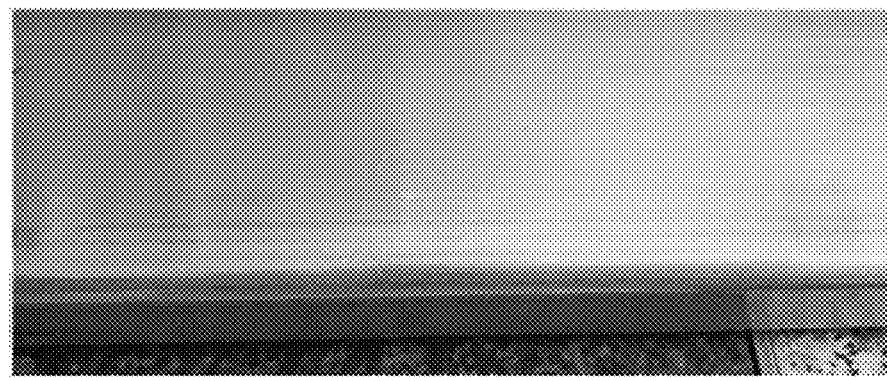
FIG. 4 is an enlarged photograph showing an example of a tubular structure manufactured by the method of FIG. 1.
Figure 5:
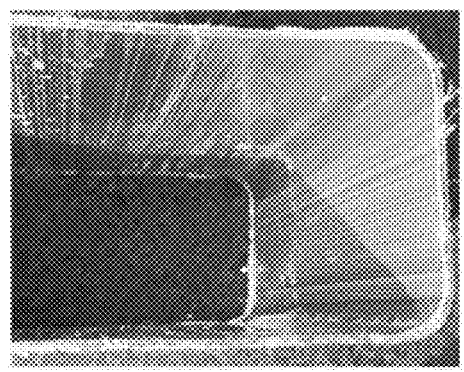
FIG. 5 is a photograph showing an interior of the tubular structure manufactured by the method of FIG. 1.

When the plug mold has a reduced curvature, rupture may be generated at the extruded material as inside portions of corners of the extruded material are pinched. In addition, wrinkles may be formed at the extruded material and, as such, a phenomenon in which the extruded material is jammed in the mold may occur. On the other hand, when the plug mold has an increased curvature, the pinch phenomenon disappears, and drawing may be achieved without rupture (cf. FIGS. 2 to 4).

When the die mold has a reduced curvature, adjustment of squareness and outer dimension may become easy. In addition, corners may be formed to be sharp and, as such, there is an advantage in that generation of a space between rectangular battery cans may be minimized.

In addition, the thickness, outer dimension, and curvature of the product are determined as the product passes between the die mold and the plug mold. For smooth drawing, a taper is formed at contact portions of the die mold and the plug mold. In this case, introduction of the material into the drawing mold may be easily carried out. Generally, a mold made of a tungsten carbide (WC) material is used in order to prevent mold soldering. In this case, however, manufacturing cost is high, and correction of the mold after manufacture is impossible. To this end, hot-work tool steel, cold-work tool steel or the like may be used, and surface coating treatment using CrN, AlTiN, DLC, etc. may be performed in order to obtain lubricity and excellent wear resistance. This method is advantageous in terms of a reduction in cost.

Thermal treatment after extrusion may be performed in accordance with properties of the material. Thermal treatment after drawing may be performed.

As apparent from the above description, the tubular structure for a rectangular battery can for an electric vehicle and the method of manufacturing the same according to the exemplary embodiments of the present invention may achieve a reduction in the number of processes and, as such, a reduction in manufacturing cost, a reduction in process failure, and a reduction in material loss may be achieved.

In addition, an additional process including welding may be eliminated and, as such, there is an effect of reducing defects possibly generated in such a process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a tubular structure for a rectangular battery can for an electric vehicle, using an aluminum alloy, the method comprising:
    hot-extruding a material prepared using the aluminum alloy at a high temperature such that the extruded material has a rectangular cross-section while having a thickness tolerance of ±0.07 to 0.10 mm; and
    drawing the hot-extruded material using a drawing mold such that the drawn material has a thickness tolerance of ±0.07 mm or less.

2. The method according to claim 1, wherein the drawing is skin pass drawing.

3. The method according to claim 1, wherein the drawing mold comprises a die mold and a plug mold, and is manufactured such that a curvature of the plug mold is equal to or greater than a curvature of the die mold.

4. The method according to claim 1, wherein the hot-extruding is performed under a pressure of 200 bar or more, at a high temperature of 500° C. or more, and at a speed of 1.0 to 5.0 mm/s.

5. The method according to claim 1, wherein the material drawn in the drawing has a tubular structure, and the tubular structure has, at a corner thereof, a curvature having a diameter of 1.0 to 4.0 mm.

6. A tubular structure for a rectangular battery can for an electric vehicle manufactured through the method according to claim 1.

* * * * *